(12) United States Patent
Miyake et al.

(10) Patent No.: US 6,172,997 B1
(45) Date of Patent: Jan. 9, 2001

(54) INTEGRATED SEMICONDUCTOR DIODE LASER PUMPED SOLID STATE LASER

(75) Inventors: Charles I. Miyake, Kirkland; Leonard P. Pearson, Bellvue; Jeffrey Pierce, Monroe, all of WA (US)

(73) Assignee: Aculight Corporation, Bothell, WA (US)

(*) Notice: Under 35 U.S.C. 154(b), the term of this patent shall be extended for 0 days.

(21) Appl. No.: 09/097,648

(22) Filed: Jun. 16, 1998

(51) Int. Cl.$^7$ ............................................. H01S 5/024
(52) U.S. Cl. ........................... 372/36; 372/75; 372/109
(58) Field of Search .......................... 372/36, 109, 75; 385/49

(56) References Cited

U.S. PATENT DOCUMENTS

| | | | |
|---|---|---|---|
| 4,079,404 | 3/1978 | Comerford et al. | 372/50 |
| 4,731,795 | 3/1988 | Clark et al. | 372/107 |
| 4,752,109 | 6/1988 | Gordon et al. | 385/14 |
| 4,904,036 | * 2/1990 | Blonder | 385/49 |
| 4,989,935 | 2/1991 | Stein | 250/551 |
| 5,014,279 | 5/1991 | Esterowitz et al. | 372/41 |
| 5,062,117 | * 10/1991 | Anthon et al. | 372/109 |
| 5,077,878 | 1/1992 | Armiento et al. | 29/25.02 |
| 5,150,376 | * 9/1992 | Ohmori et al. | 372/33 |
| 5,265,113 | * 11/1993 | Halldorsson et al. | |
| 5,268,066 | 12/1993 | Tabasky et al. | 216/17 |
| 5,329,539 | 7/1994 | Pearson et al. | 372/36 |
| 5,412,683 | 5/1995 | Nighan, Jr. et al. | 372/75 |
| 5,535,296 | 7/1996 | Uchida | 385/89 |
| 5,548,605 | 8/1996 | Benett et al. | 372/36 |
| 5,608,749 | * 3/1997 | Kizuki | 372/36 |
| 5,796,771 | 8/1998 | DenBaars, et al. | 372/75 |
| 5,856,996 | 1/1999 | Durkin et al. | 372/98 |

FOREIGN PATENT DOCUMENTS 40 41 130 A1    7/1992 (DE) .

* cited by examiner

*Primary Examiner*—James W. Davie
(74) *Attorney, Agent, or Firm*—McCutchen, Dole, Brown & Enerson, L.L.P.; David G. Beck

(57) ABSTRACT

A method and apparatus for fabricating extremely robust opto-electronic devices on a monolithic support structure is provided. Incorporated into the support structure are registration structures that are used to quickly and accurately align the various components associated with the device, typically eliminating the need for manual component alignment. The registration structures are fabricated using conventional lithographic techniques, offering alignment accuracy of a micrometer or less. Utilizing the registration structures, a gain module is fabricated that is comprised of at least a pump laser, an optical element, and a solid state gain medium. The pump laser is preferably a semiconductor diode laser that pumps the edge of the gain medium, thus eliminating many of the difficulties that arise from end pumping the medium. The optical element, interposed between the pump laser and the gain medium, collimates and/or focuses the emissions from the pump laser onto the laser medium in such a manner as to optimize the efficiency of the module. The gain module may include several pump lasers, thus increasing the achieved output power. The gain module preferably projects through a cutout in a miniature optical bench. The optical bench is comprised of a material with a very low coefficient of thermal expansion, thus providing thermal stability. The surface of the optical bench is metallized, preferably in a pattern of gold pads. Optical components to be attached to the optical bench are metallized as well, thus allowing the components to be soldered into place. The optical bench is used to form various laser systems utilizing the integral gain module.

19 Claims, 8 Drawing Sheets

INTEGRATED SEMICONDUCTOR DIODE LASER PUMPED SOLID STATE LASER

BACKGROUND OF THE INVENTION

The present invention relates generally to solid state lasers and, more particularly, to a method and apparatus for fabricating integrated semiconductor diode laser pumped solid state lasers.

Semiconductor lasers of GaAlAs, GaAs, InGaAs and other materials have been used to excite solid state media to achieve laser oscillation. Typically solid state laser media are comprised of a doped crystalline, polymer or glass host material, for example, Nd:YAG, Nd:YLF, Nd:YVO$_4$, or Yb:YAG. In order to obtain laser oscillation, the laser media is placed within an optical resonator cavity that includes appropriate cavity optics.

In designing a diode pumped solid state laser, the various optical components must be aligned to each other with positional tolerances on the order of 10's of micrometers. Conventional solid state lasers use mechanical mounting components and structures, many with adjustment capabilities, to accurately position the optical components. These mechanical mounts are typically manufactured using conventional metal fabrication techniques (e.g., grinding, lapping, milling, turning, etc.), thereby resulting in dimensional imperfections. As a result of these imperfections, the optical components of the solid state laser must be manually aligned.

A variety of systems have been designed to precision align various optical components, thus requiring little if any manual alignment. In U.S. Pat. No. 4,731,795 a monolithic support structure fabricated of metal or plastic is disclosed that automatically places the individual components into the proper relationship to one another. In at least one embodiment, the support structure is comprised of a substantially tubular housing of metal, ceramic, glass, thermoplastic material or thermosetting material and is formed using conventional fabrication techniques such as machining, injection molding, or die casting. Within the housing is an optical pump comprised of a laser diode, a heat sink, a lens, a laser medium, and an output coupler. The system may also include a nonlinear optical material.

A variety of precision optical assemblies have also been fabricated that take advantage of miniature optical components. For example, in U.S. Pat. No. 4,079,404 an optical assembly is disclosed in which the optical components are aligned and supported by one or more wafers. In order to align and orient the various optical components, a series of V-shaped grooves are etched into the wafer surface using conventional photolithographic techniques. Into one series of parallel grooves are placed fiber optic waveguides, the waveguides abutting a cylindrical lens laid into a perpendicular groove. A laser package such as a GaAlAs double heterostructure laser is attached to the wafer. In order to attach the laser, complementary grooves are etched into the wafer and the laser. Within the complementary grooves are placed locating fibers.

U.S. Pat. No. 4,904,036 discloses optoelectronic chips in which lasers and photodiodes are mounted onto single crystal silicon bases. The lasers and photodiodes are interconnected using silica waveguides and couplers integrally formed onto the base. In one embodiment a pair of tandem V-shaped grooves are etched into the base and aligned with the optical axis of the waveguide. The size of one of the grooves is adapted to receive the bare portion of an optical fiber while the size of the second groove is adapted to receive the coated portion of the optical fiber. Thus the grooves allow a fiber to be easily aligned with the waveguide.

U.S. Pat. No. 5,268,066 discloses an optical assembly system that utilizes mechanical registration features to facilitate the passive alignment of lasers integrated on a chip to optical fibers in integral contact with the substrate. The system includes pedestal structures formed on the substrate that define various mounting regions. The pedestal structures are formed through a combination of etching, masking, and polyimide deposition steps. The assembly and registration system also includes a series of V-shaped grooves etched into the substrate, the grooves being used to register the optical fibers.

U.S. Pat. No. 5,548,605 discloses a monolithic microchannel heat sink for use with diode lasers. A series of slots are sawn into a silicon wafer, thus allowing the diode laser to be mounted in contact with the silicon. In order to provide cooling, a series of microchannels are etched into the back of the wafer. The channels are rotated by an angle perpendicular to the diode bars, thereby providing increased penetration between the mounted diode bars. The microchannel heat sinks have low thermal resistance due to the close proximity of the microchannels to the laser diode being cooled.

Although a variety of optical assemblies have been fabricated using miniature optical components and monolithic support structures, a method of economically packaging semiconductor pump lasers with solid state gain media is desired.

SUMMARY OF THE INVENTION

The present invention provides a method and apparatus for fabricating extremely robust opto-electronic devices contained on a monolithic support structure. Incorporated into the support structure are registration structures that are used to quickly and accurately align the various components associated with the device, typically eliminating the need for manual component alignment. The registration structures are fabricated using conventional lithographic techniques, offering alignment accuracy of a micrometer or less. A variety of registration structures may be used, including V-grooves, wells, tapered wells, and stops.

In one aspect of the invention, a gain module is fabricated. The components of the gain module are bonded to a monolithic substrate, preferably of silicon although other materials may be used. Prior to bonding, registration structures are formed on the surface of the substrate. The gain module components are comprised of a pump laser, an optical element (e.g., a lens), a waveplate, and a solid state gain medium. The pump laser is preferably a semiconductor diode laser that pumps the edge of the gain medium, thus eliminating many of the difficulties that arise from end pumping the medium. The optical element, for example a collimating lens, is interposed between the pump laser and the gain medium and collimates and/or focuses the emissions from the pump laser onto the laser medium in such a manner as to optimize the efficiency of the module. The gain module may also include other components, for example a waveplate to provide the gain medium with pump light of the desired polarization. A single gain module may also include several pump lasers and/or gain media, thus increasing the achieved output power.

In another aspect of the invention, a gain module is mounted to a heat spreader, thus inhibiting the development of hot spots in the substrate due to localized heating within either the gain media or the pump laser. To further inhibit the development of hot spots, the substrate is preferably thinned to the extent possible without sacrificing module rigidity and robustness. In addition, the surface of the substrate to be bonded to the heat spreader may first be coated with a material offering improved thermal conductivity such as diamond or copper. If the gain module is to be operated at sufficiently high powers and sufficiently extended times as to affect module life, the heat spreader is preferably attached to a heat sink. Depending upon the desired application, the heat sink may be either passive or active.

In another aspect of the invention, a gain module attached to a heat spreader is projected through a cutout in a miniature optical bench. Although it is desirable to rigidly attach the gain module to the optical bench, preferably they are thermally isolated from one another. The optical bench is comprised of a material with a very low coefficient of thermal expansion, thus providing thermal stability. The surface of the optical bench is metallized, preferably in a pattern of gold pads. Optical components to be attached to the optical bench are metallized as well, thus allowing the components to be soldered into place. The optical bench is used to form various laser systems in which the gain module projecting through the bench is integral. Such systems range from simple resonator cavities to more complex multi-wavelength systems.

A further understanding of the nature and advantages of the present invention may be realized by reference to the remaining portions of the specification and the drawings.

DESCRIPTION OF THE SPECIFIC EMBODIMENTS

Figure 1:
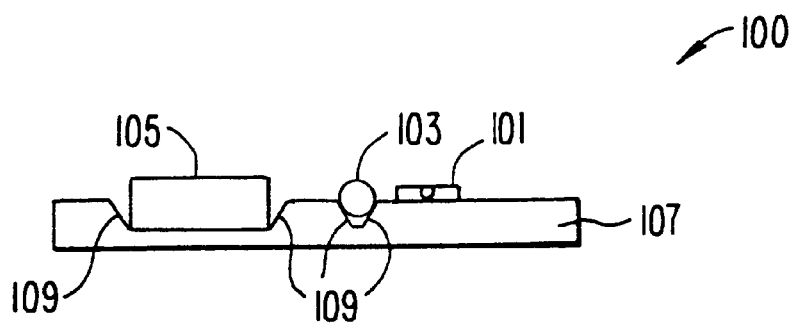
FIG. 1 is a cross-sectional view of a simple gain module according to the invention.
Figure 2:
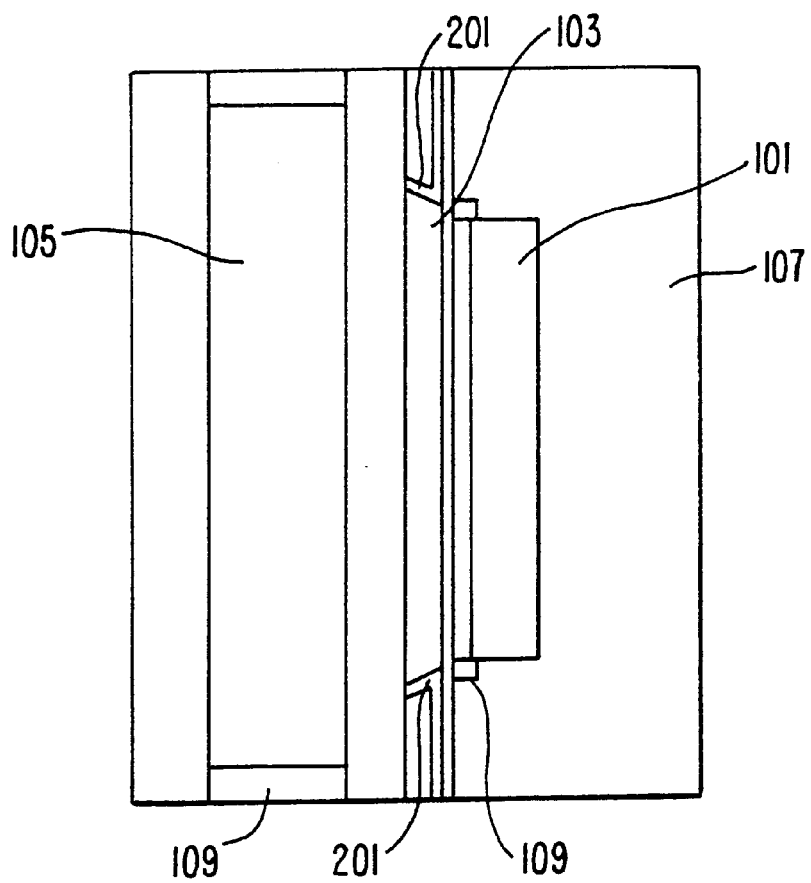
FIG. 2 is a top view of the embodiment of the invention illustrated in FIG. 1.

FIGS. 1 and 2 illustrate one embodiment of the present invention. FIG. 1 illustrates the cross-section of a device 100 that includes a laser diode 101, a cylindrical lens 103, and a laser pump medium 105. These opto-electronic components are mounted to a substrate 107, substrate 107 providing a plurality of registration structures 109. FIG. 2 is a top view of the embodiment shown in FIG. 1.

Substrate 107 is a monolithic structure comprised of a material suitable for use with standard photolithographic techniques. Preferably substrate 107 is comprised of silicon. Registration structures 109 are formed in substrate 107 such that the components of interest, in this example diode 101, lens 103, and laser medium 105, may be properly positioned relative to each other with minimal, if any, manual alignment. For example, if a V-groove 109 is used to position cylindrical lens 103, the lens is forced into a very specific location within the groove. By placing a registration structure 201 on either end of lens 103, the position of the lens is completely defined by the mounting substrate making placement of the lens a simple operation. The other components involved in structure 100 may be similarly located. Once the components are placed into position, they are bonded to the structure. The resultant structure is therefore simple to fabricate, minimizing both time and costs, and extremely robust.

Lithographic techniques for forming structures in a substrate are well known by those of skill in the art. Tolerances on the order of a micrometer or less may be routinely achieved using such techniques. Typically the substrate of interest is first coated with a photoresist. The photoresist is then exposed with a pattern using a lithographic technique, the pattern defining the desired registration structures. Either a chemical etching technique or some other material removal technique is then used to micro-machine the desired structures into the substrate based on the lithographic pattern.

Figure 3:
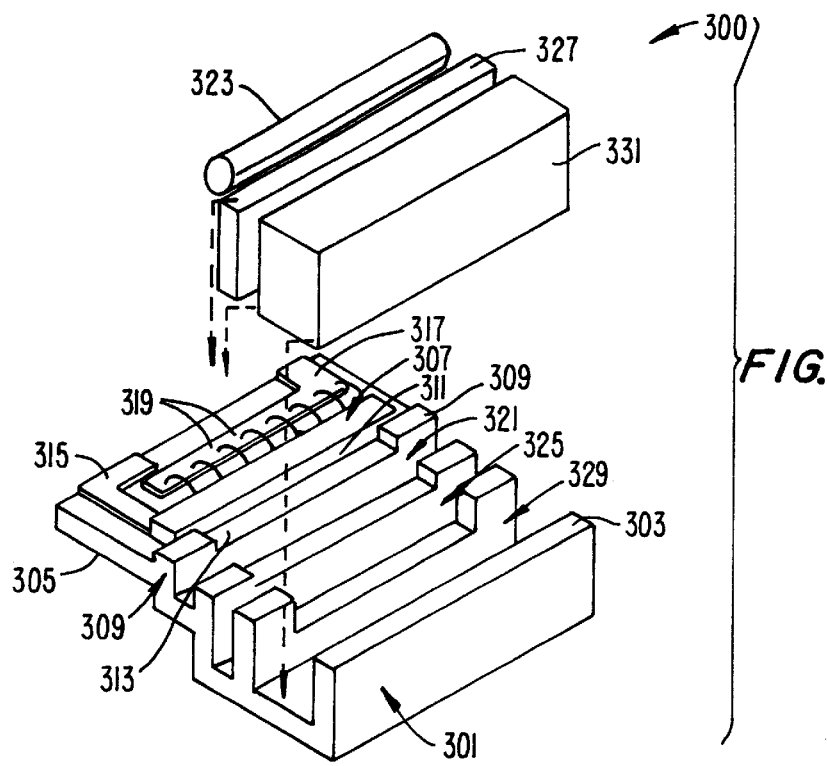
FIG. 3 is a perspective view of another gain module according to the invention.

FIG. 3 is a perspective view of an embodiment of the invention. A silicon substrate 301 has been micro-machined in order to provide a series of registration structures in the front surface 303. The back surface 305 of substrate 301 has been selectively thinned, thereby allowing more efficient cooling of a pump laser 307. Pump laser 307 is mounted to surface 303 against a pair of locating stops 309 such that the emission face 311 of laser 307 is positioned at the edge of a recess 313 micro-machined into substrate 301. Pump laser 307 is preferably a semiconductor diode laser, diode laser bar, or diode laser array. Prior to bonding laser 307 into place, a portion of surface 303 is preferably metallized using a thick film metallization process to form a pair of laser contacts 315 and 317. Although a variety of techniques may be used to couple the contacts to the laser, preferably contact 315 is located such that laser 307 is directly soldered to it after laser 307 has been properly positioned. Contact 317 is preferably wire bonded with a plurality of wires 319 to the top surface of laser 307.

A well 321 is micro-machined into substrate 301 adjacent to pump laser 307. Well 321 may have a rectangular cross-section as shown, or a V-shaped groove as shown in FIG. 1. Within well 321 a collimating lens 323 is positioned. Although lens 323 is preferably a rod lens, a fiber lens, aspheric rod lens, or other lens may be used depending upon the desired laser configuration. Well 321 is sized to position the centerline of collimating lens 323 at the same height as the emissions from pump laser 307. The inside of well 321 may be metallized to provide a contact surface for soldering collimating lens 323 into place. Alternatively, an epoxy or other adhesive may be used to mount lens 323 into place after it has been properly located.

A well 325 is micro-machined into substrate 301 adjacent to lens well 321. This well is used to locate a waveplate 327 in the opto-electronic structure. Similarly, a well 329 adjacent to well 325 is used to locate a solid state laser media 331. Waveplate 327 is used to rotate the polarization emitted by laser 307 to match the requirements of media 331 (e.g., Nd:YVO$_4$). Thus if media 331 does not require a polarization change, for example in certain configurations utilizing a media of Nd:YAG or Nd:YLF, waveplate 327 would be unnecessary (see, for example, the structure illustrated in FIGS. 1 and 2). Utilizing lithography techniques, the location of wells 325 and 329 is sufficiently precise to achieve the required parallelism between the elements. As with lens 323, waveplate 327 and laser media 331 may be bonded to substrate 301 using an adhesive or soldered into place if the wells have been properly metallized.

The individual gain module components can be registered to the substrate using a variety of techniques. For example, one technique is a V-groove as illustrated in FIG. 1 with regards to the registration of the collimating lens. Alternatively, a registration well can be used that is large enough to accommodate the component with very little extra space, thus insuring a tight fit and an accurate placement of the component (see, for example, FIG. 11). Alternatively, a registration well can be used that includes a small taper. In this embodiment the complementary component, for example a lens, preferably includes a matching taper. The complementary tapers insure accurate placement of the component of interest. Alternatively, the registration structures may be formed such that only a single side of the component rests against the structures. In this case the component is pressed against the registration structures prior to bonding.

Figure 4:
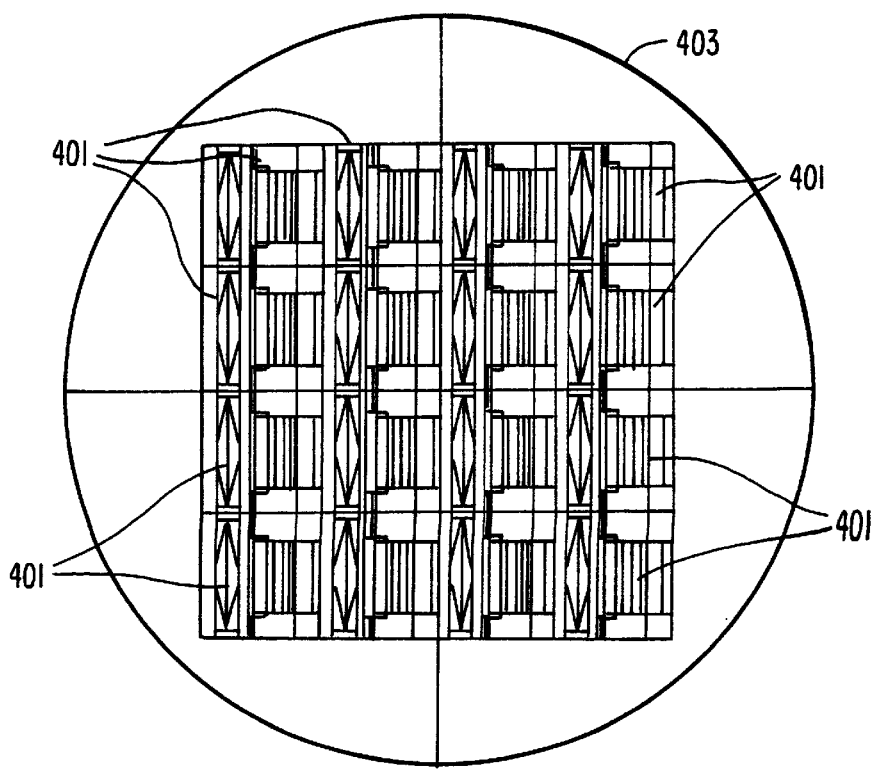
FIG. 4 is an illustration of the layout of 16 gain module substrates on a single 4 inch wafer.
Figure 5:
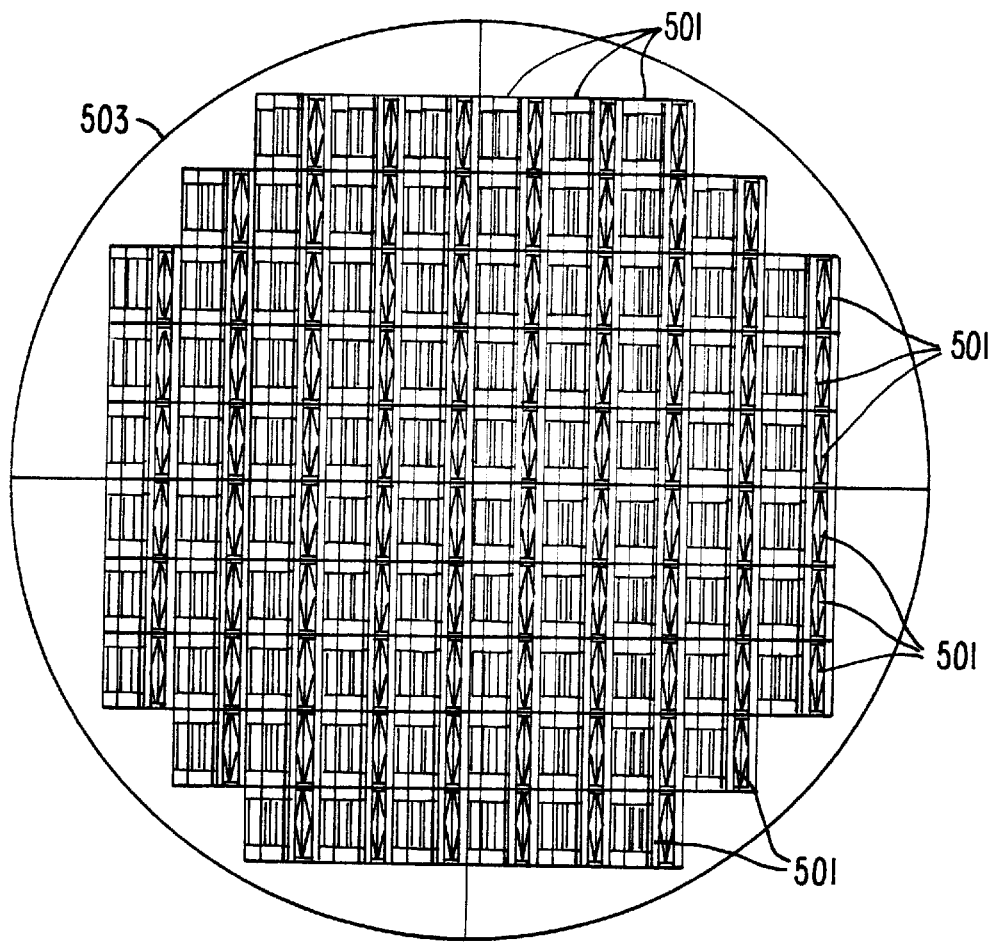
FIG. 5 is an illustration of the layout of 88 gain module substrates on a single 8 inch wafer.

One benefit of the present invention is the ease by which numerous module substrates may be fabricated, each substrate offering automatic registration of the optical components. For example, FIG. 4 is an illustration of the layout of 16 gain module substrates 401 on a single 4 inch wafer 403. Each of these module substrates is intended for use in a configuration similar to that shown in FIG. 3, i.e., a side-pumped gain module with a pump laser, a collimating lens, a waveplate, and a gain medium. Thus the wafer shown in FIG. 4 would provide 16 gain module substrates, these substrates being fabricated in a simultaneous fashion using lithographic-based micro-machining techniques. Similarly, FIG. 5 illustrates the layout of 88 gain module substrates 501 on a single 8 inch wafer 503.

Although the gain module 300 illustrated in FIG. 3 includes diode pump source 307, optical coupling elements 323 and 327, and solid state gain media 331 in a side-pumped configuration, other configurations may also be fabricated using the present invention. For example, the gain media could also be end pumped or face pumped.

Figure 6:
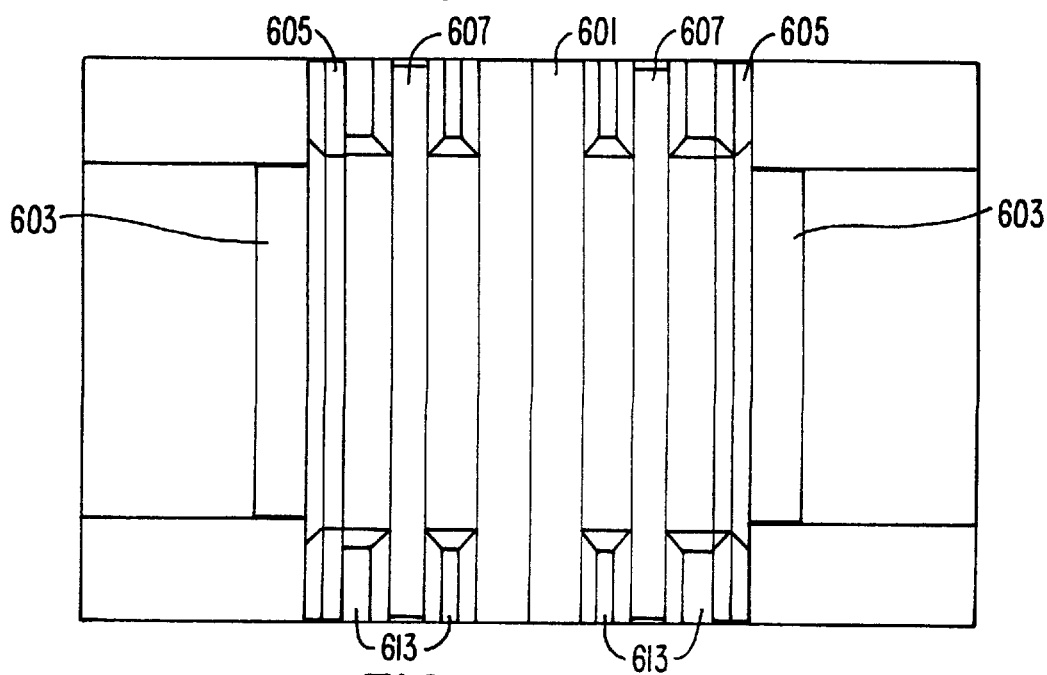
FIG. 6 is a top view of an embodiment of the invention in which a single gain media is side pumped from two sides.
Figure 7:
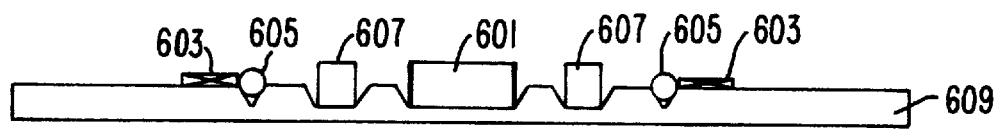
FIG. 7 is a cross-sectional view of the embodiment illustrated in FIG. 6.

FIG. 6 is an illustration of an embodiment of the invention in which a single solid state laser media 601 is pumped from both sides using a pair of semiconductor pump lasers 603. As in the embodiment shown in FIG. 3, the output of pumps 603 pass through collimating lenses 605 and waveplates 607 before impinging on media 601. FIG. 7 is a cross-sectional view of the device shown in FIG. 6. One of the benefits associated with this dual pumping configuration is that more power may be obtained from gain media 601. As in the previous embodiments, all of the components are aligned on a substrate 609 using micro-machining techniques, the micro-machining providing a series of alignment structures 613.

Figure 8:
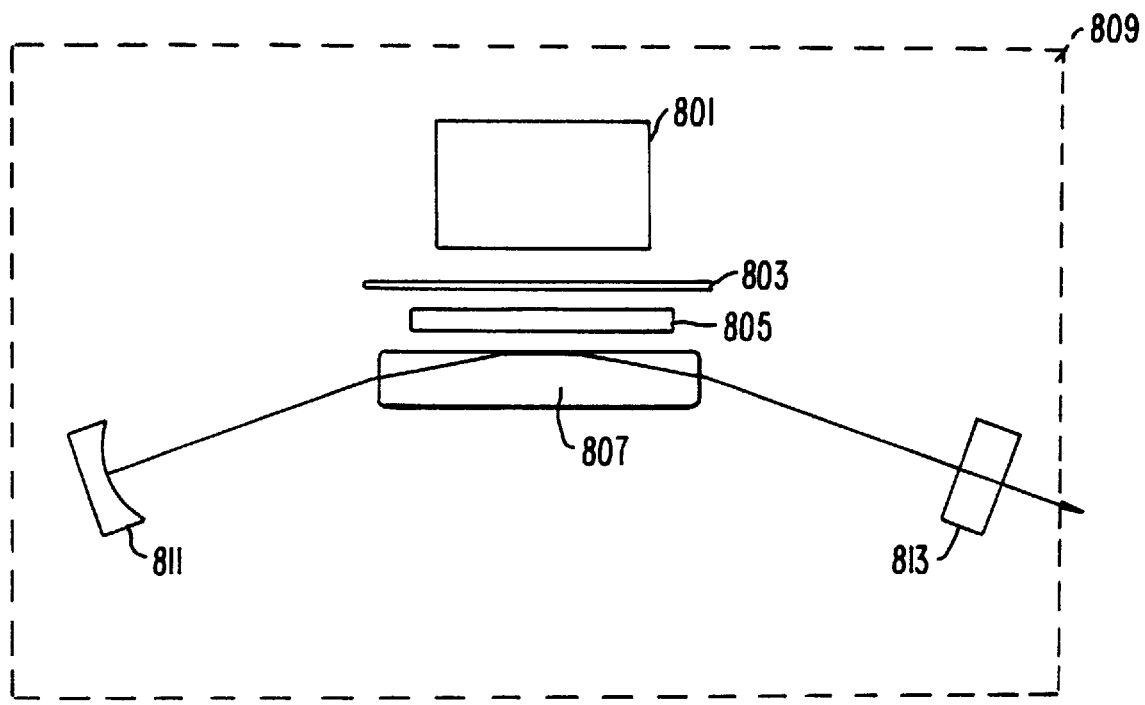
FIG. 8 is an illustration of a single side pumped assembly and the resonator optics associated with the gain media.

Besides providing a simple method of aligning the primary components of a gain module through a series of registration structures, the present invention also provides a means for positioning various other optical components associated with the module. FIG. 8 is an illustration of a single side pumped assembly such as that shown in FIG. 3. As in the previously illustrated embodiment, a pump diode 801, a coupling lens 803, a waveplate 805, and a laser gain media 807 are all bonded to a monolithic substrate 809 that includes registration structures to provide easy component alignment. Also included in this configuration are resonator optics 811 and 813. Optic 811 is a high reflector and optic 813 is an output coupler. As illustrated, the resonator utilizes the TIR (i.e., total internal reflection) cavity design, also referred to as the diamond bounce extraction method, in order to extract the bulk of the diode pump power absorbed near the pump surface. As is well known by those of skill in the art, this design also tends to correct for some of the thermally induced focus. While this is the preferred embodiment for optical extraction, the resonator beam may also pass straight through the gain medium.

Figure 9:
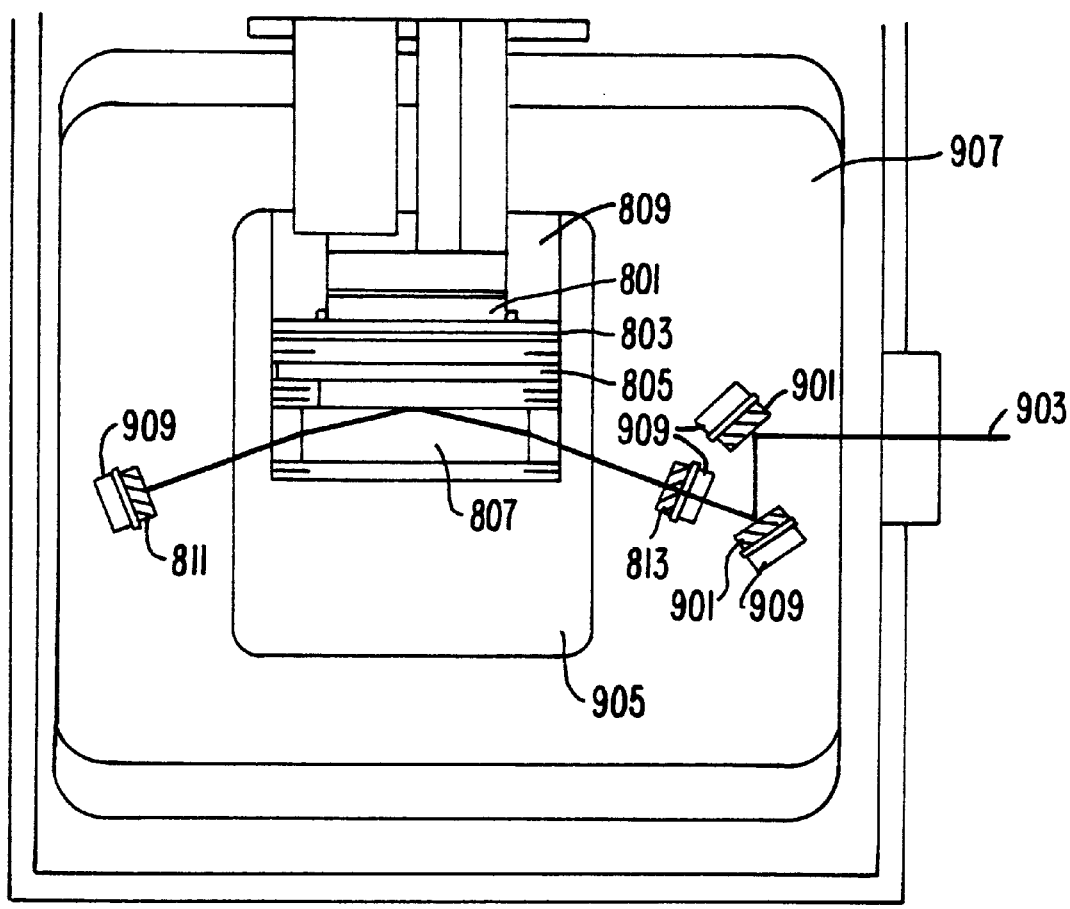
FIG. 9 is an illustration of a laser layout using a side pumped gain module and a resonator attached to a separate, thermally isolated platform.

Although the resonator optics can be bonded directly to substrate 809, preferably they are thermally isolated from pump laser 801 and gain media 807, thus providing better optical stability in the resonator cavity. The module assembly illustrated in FIG. 9 is similar to that shown in FIG. 8. This assembly also includes a pair of mirrors 901 that are used to align the output of the assembly along the desired optical axis 903. In this configuration substrate 809 is attached to a heat spreader 905 that helps to prevent hot spots near laser diode 801 and laser gain media 807. Heat spreader 905 may be attached to various types of heat sinks either directly or indirectly using heat pipes. Suitable approaches for heat sinking the thermal load developed by the gain module include passive cooling (e.g., thermal mass), active cooling (e.g., fins and forced air convection, liquid coolant, etc.), and thermal transfer (e.g., heat pipe coupled to a thermal electric cooler or a cold plate, etc.). If desired, a thin film of a thermally conductive material (e.g., diamond film, copper film, etc.) can be applied between substrate 809 and heat spreader 905, thus further inhibiting the development of hot spots in substrate 809. Heat spreader 905 projects through a cutout in a miniature optical bench 907. Resonator optics 811 and 813 as well as associated optics 901 are all mounted directly to bench 907.

Miniature bench 907 is preferably fabricated from a material that has a very low coefficient of thermal expansion, thereby making the resonator cavity formed by optics 811 and 813 relatively insensitive to thermal variations. For example, bench 907 may be fabricated from Zerodur. The surface of bench 907 is metallized, preferably with small gold pads. The optics, for example resonator optics 811 and 813 as well as mirrors 901, are mounted to ceramic substrates 909, each of which have a metallized mounting surface. If desired, heaters may be integrated directly into the optical mounts. Once an optic has been placed in the desired location, it may be soldered into place by soldering the metallized ceramic substrate to the metallized pad on the optical bench. This approach completely eliminates the need for standard mechanical mounts and results in an extremely robust assembly. Furthermore, since the gain module mounted on heat spreader 905 is separate from the resonator optics mounted on optical bench 907, a single gain module may be adapted for use with a variety of laser designs by simply replacing one optical bench 907 with another. Thus harmonic generators, optical parametric oscillators (i.e., OPOs), etc. can easily be integrated into the assembly. Lastly, the relative ease by which either an optical bench or a gain module may be replaced makes system repair quite straightforward.

Another benefit of the present invention is that it is amenable to robotic fabrication and assembly, thus reducing the costs per device. For example, as illustrated in FIGS. 4 and 5 above, a large number of gain module substrates can be simultaneously fabricated using techniques that are well known in the semiconductor industry. Furthermore, the individual components of both the gain module and the laser system may be located and bonded into position on the gain module substrate and the optical bench, respectively, using robotics. In the preferred embodiment, assembly tooling is used in order to allow multiple components to be simultaneously aligned and mounted.

Figure 10:
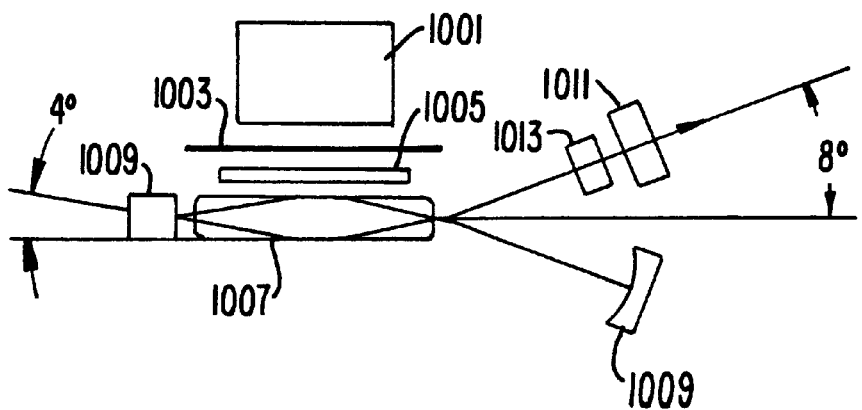
FIG. 10 is an illustration of another embodiment of a laser system based on the single side pumped gain module.

FIG. 10 is an illustration of a resonator design utilizing the present invention. As in the previous design, the gain module includes a diode pump laser 1001, a collimating lens 1003, a waveplate 1005, and a gain media 1007. The resonator utilizes two high reflectors, 1009, and an output coupler 1011. The cavity may also includes a Q-switch, 1013, preferably a passive Q-switch such as a piece of $Cr^{4+}$:YAG that acts as a saturable absorber.

Figure 11:
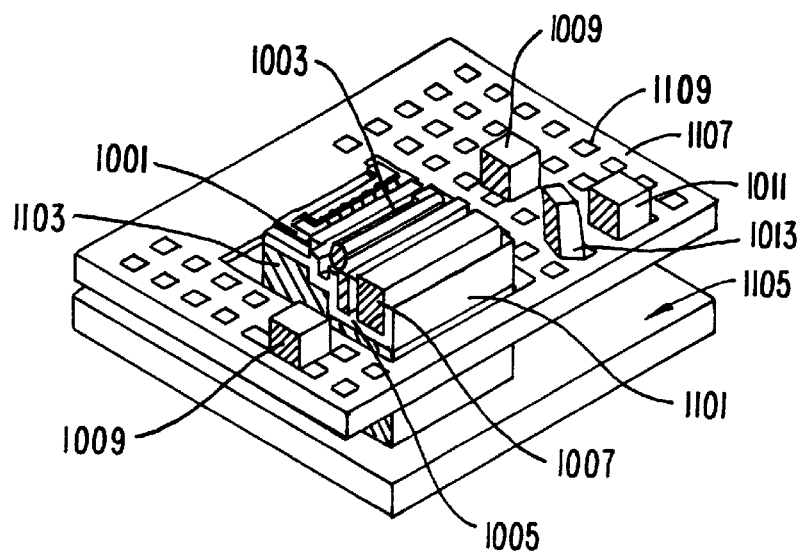
FIG. 11 provides a perspective view of the embodiment illustrated in FIG. 10.

FIG. 11 provides a prospective view of the embodiment shown in FIG. 10. The gain module components are attached to a substrate 1101 that includes a plurality of registration structures as described above. The back side of substrate 1101 has been thinned, preferably using chemical etching, to allow efficient removal of heat from the gain module. Substrate 1101 is attached to a heat spreader 1103, preferably in a manner that provides a good thermal contact between the heat spreader and the substrate, for example using metallized surfaces and an indium based solder. Heat spreader 1103 is attached to a heat sink 1105 and is thermally isolated from the optical bench 1107. The surface of bench 1107 is covered with a plurality of gold metallized pads 1109 by which the cavity optics are attached.

Figure 12:
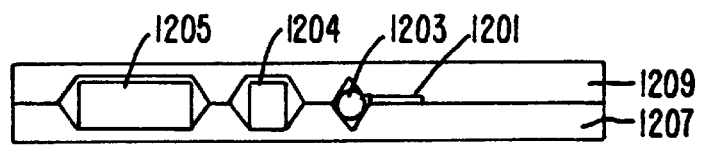
FIG. 12 is a cross-sectional view of a simple gain module that includes both a lower and an upper substrate.

The present invention is not limited to the embodiments illustrated above. Rather, the invention can be applied to numerous different gain modules (i.e., different types of pump lasers, collimating lenses, and gain media), numerous different resonator designs, and to micro-optical benches utilizing diode lasers and optical elements alone with a plurality of optical configurations. The micro-machining techniques described above can also be applied to an upper substrate, the upper substrate providing additional rigidity and therefore stability to the module. For example, the gain module illustrated in FIG. 12 includes a pump diode laser 1201, a collimating lens 1203, a waveplate 1204, and a gain media 1205 as shown in FIG. 3. However, as opposed to being bonded to a single substrate, the gain module components in this embodiment are sandwiched between a lower substrate 1207 and an upper substrate 1209, each of which have been micro-machined to provide appropriate registration structures. Besides the advantages of rigidity and component protection, this configuration also allows the gain medium to be cooled from both the lower and upper surfaces. Thus it is possible& to thin both substrates 1207 and 1209 and attach each of them to individual heat sinks.

Figure 13:
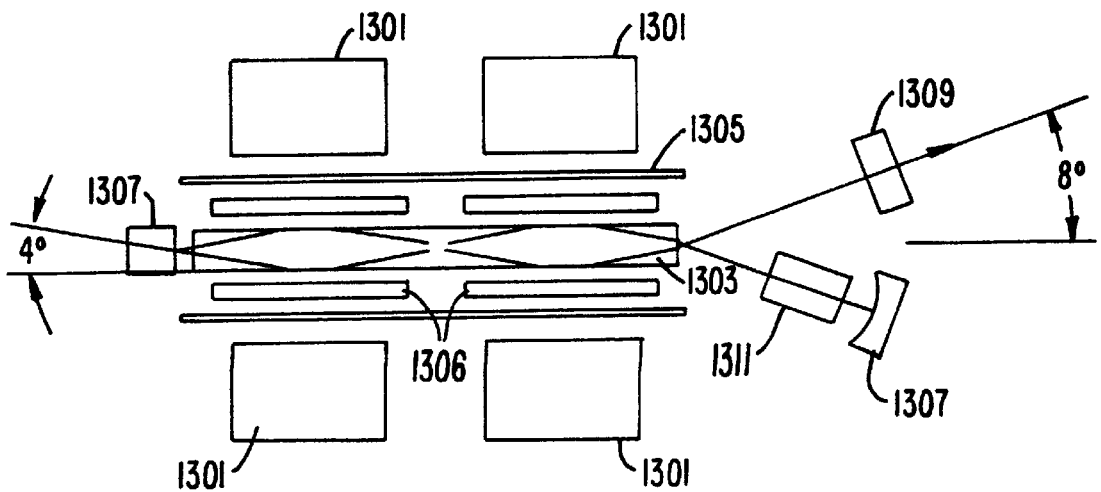
FIG. 13 is an illustration of an embodiment of the invention utilizing four diode pumps.

FIG. 13 illustrates an embodiment intended to achieve higher output power. This embodiment utilizes four pump lasers 1301 to pump a single gain media 1303. Depending upon the availability of such large blocks of gain media, it is also possible to utilize two individual sections of gain media. This embodiment shows the emissions from each pump laser 1301 passing through a collimating lens 1305 and a waveplate 1306. In this embodiment, the resonator cavity is comprised of two reflectors 1307 and an output coupler 1309. If desired, a Q-switch 1311 or a non-linear optical material may be inserted into the cavity.

Figure 14:
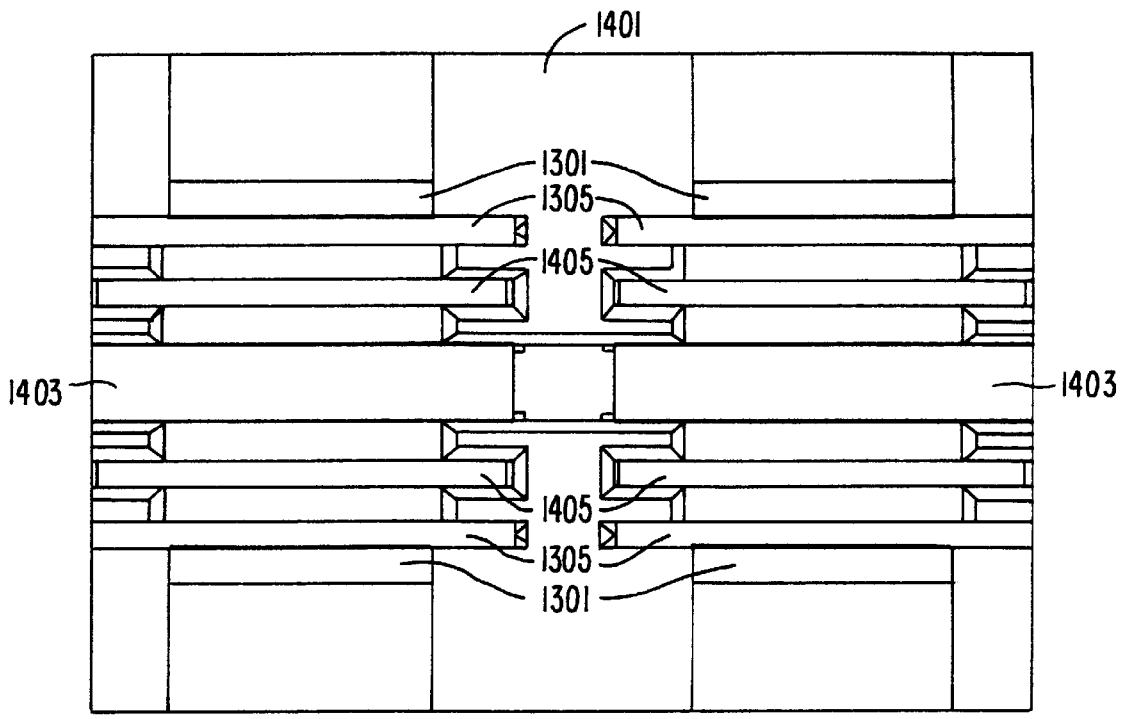
FIG. 14 is an illustration of a single substrate micro-machined to accept four pump lasers and two laser gain media blocks.

FIG. 14 illustrates a single substrate 1401 that has been micro-machined to accept four pump lasers 1301, four collimating optics 1305, and two gain media blocks 1403. The system also includes four waveplates 1405.

Figure 15:
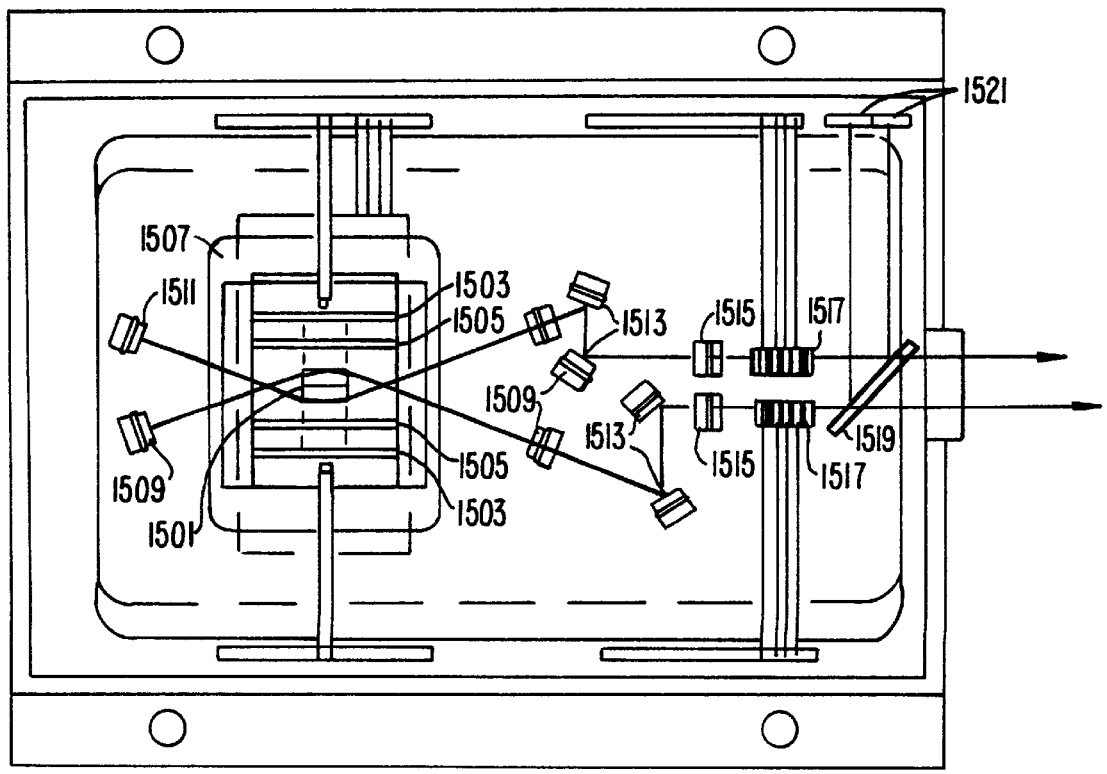
FIG. 15 is an illustration of an embodiment of the invention for use as a two color laser system.

FIG. 15 illustrates an embodiment of the invention for a two color laser system. In this design a gain media 1501 is pumped from both sides using a pair of pump lasers 1503. The output of pump lasers 1503 pass through a pair of collimating lens 1505 prior to impinging on gain media 1501. As in the previous illustrated embodiments, the gain module components are attached to a monolithic substrate 1507 in which registration structures have been micro-machined. Two different resonator cavities operating at two different wavelengths are comprised of cavity optics 1509 and 1511, respectively. The output from each of these cavities passes through a pair of alignment mirrors 1513. In the preferred embodiment of this configuration, the aligned outputs from each resonator cavity are then passed through focussing optics 1515 and then through non-linear materials 1517 for harmonic conversion. A small portion of each beam is then split off using a beam splitter 1519, the split off portions passing to a pair of detectors 1521.

Figure 16:
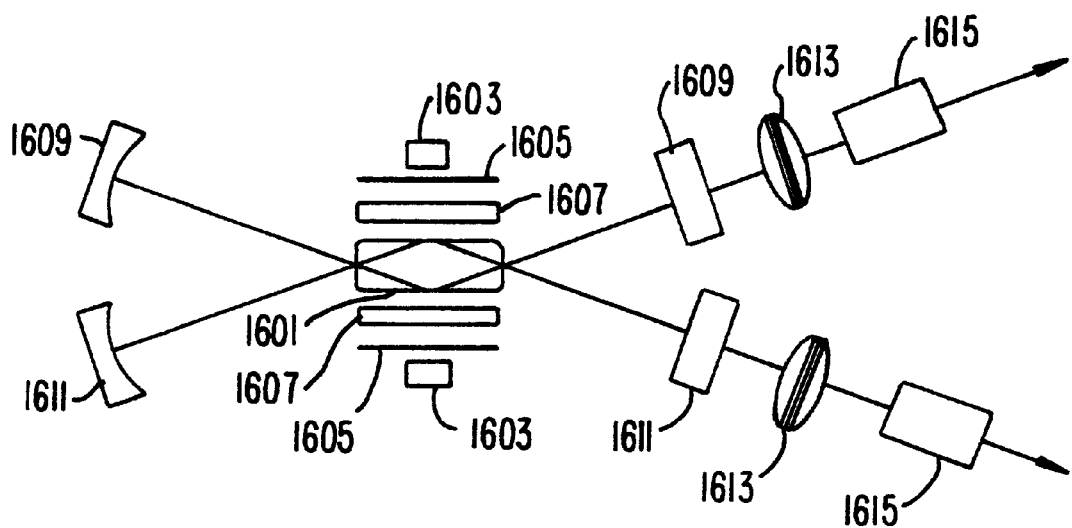
FIG. 16 is an illustration of another multi-wavelength system according to the invention.

FIG. 16 illustrates another embodiment of a multi-wavelength system fabricated using the present invention. In this embodiment a laser media 1601 is pumped from both sides using two pump lasers 1603. Obviously alternative pumping arrangements (e.g., two or more pump lasers) are equally applicable. The emission from pump laser 1603 passes through a rod lens 1605 and a waveplate 1607 before impinging on media 1601. As in the previous embodiment, in this embodiment two different resonator cavities operating at two different wavelengths are formed using cavity optics 1609 and 1611, respectively. The output beams from each cavity pass through focussing lenses 1613 prior to passing through nonlinear crystals 1615.

Figure 17:
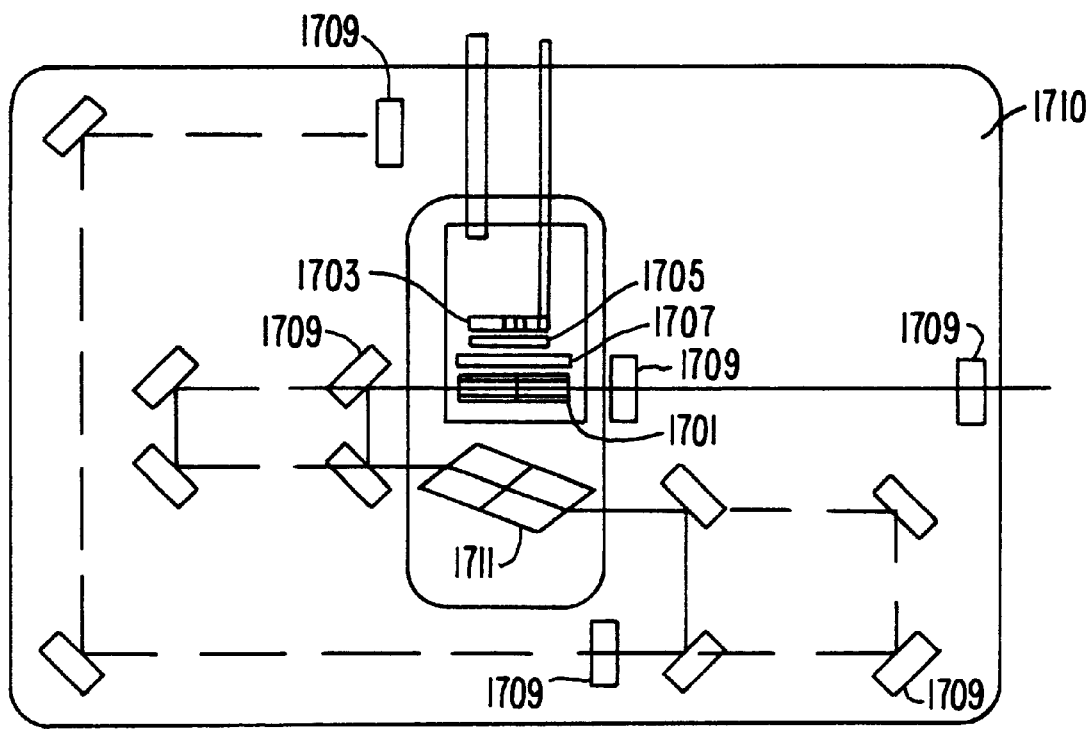
FIG. 17 is an illustration of a variable pulse length Q-switched system according to the invention.

FIG. 17 illustrates an embodiment of the invention for a variable pulse length Q-switched laser. In this embodiment a laser media 1701 is pumped from a single side using a single pump laser 1703 although alternative pumping arrangements are equally applicable. The emission from pump laser 1703 passes through a rod lens 1705 and a waveplate 1707 before impinging on media 1701. This embodiment differs from the previous embodiments in that laser optics 1709 can take one of many different positions on substrate 1710, substrate 1710 preferably fabricated from a material such as Zerodur. By varying the position of optics 1709 on substrate 1710, the cavity length may be changed by up to a factor of 5. A Q-switch 1711 is added to the cavity to produce short pulse operation. Changing the cavity length has a direct effect on the optical pulse length in Q-switched operation.

As will be understood by those familiar with the art, the present invention may be embodied in other specific forms without departing from the spirit or essential characteristics thereof. For example, the present invention can be used with a variety of different resonator designs. Accordingly, disclosure of the preferred embodiment of the invention is intended to be illustrative, but not limiting, of the scope of the invention as set forth in the following claims.

What is claimed is:

1. An opto-electronic device, comprising:
 a miniature optical bench, said optical bench of a material with a relatively low coefficient of thermal conductivity; and
 a gain module rigidly coupled to and substantially thermally isolated from said optical bench, said gain module comprising:
  a monolithic substrate, wherein a plurality of registration structures are integral to a first surface of said substrate;
  a semiconductor pump laser coupled to said substrate and located in a first position with respect to said substrate, said first position defined by a first portion of said plurality of registration structures;
  a gain medium coupled to said substrate and located in a second position with respect to said substrate, said second position defined by a second portion of said plurality of registration structures, wherein an emission from said pump laser impinges on a surface of said gain medium;
  an optical element coupled to said substrate and located in a third position with respect to said substrate, said third position defined by a third portion of said plurality of registration structures, wherein said third position is interposed between said first position and said second position, and wherein said pump laser emission passes through said optical element prior to impinging on said surface of said gain medium; and
  a heat spreader coupled to a second surface of said substrate, said second surface on an opposite side from said first surface.

2. The opto-electronic device of claim 1, further comprising a waveplate coupled to said substrate and located in a fourth position with respect to said substrate, said fourth position defined by a fourth portion of said plurality of registration structures, wherein said pump laser emission passes through said waveplate prior to impinging on said surface of said gain medium.

3. The opto-electronic device of claim 1, further comprising a heat sink coupled to said heat spreader.

4. The opto-electronic device of claim 1, wherein lithographic techniques are used to pattern said plurality of registration structures.

5. The optoelectronic device of claim 4, wherein etching techniques are used to form said lithographically patterned plurality of registration structures.

6. The opto-electronic device of claim 1, wherein said optical bench is comprised of Zerodur.

7. The opto-electronic device of claim 1, wherein at least a first surface of said optical bench is metallized.

8. The opto-electronic device of claim 7, wherein said first surface of said optical bench is metallized with gold.

9. The opto-electronic device of claim 1, wherein a plurality of metal pads are deposited on at least a first surface of said optical bench.

10. The opto-electronic device of claim 1, further comprising resonator optics coupled to said optical bench, wherein said resonator optics form a laser resonator utilizing said semiconductor laser pumped gain medium.

11. The opto-electronic device of claim 10, wherein said resonator optics are soldered to said optical bench.

12. The opto-electronic device of claim 10, further comprising a Q-switch coupled to said optical bench.

13. The opto-electronic device of claim 10, further comprising a nonlinear crystal coupled to said optical bench.

14. The opto-electronic device of claim 10, further comprising a modulator coupled to said optical bench.

15. The opto-electronic device of claim 1, further comprising:
 a second semiconductor pump laser coupled to said substrate and located in a fourth position with respect to said substrate, said fourth position defined by a fourth portion of said plurality of registration structures, wherein a second pump laser emission impinges on a second surface of said gain medium; and
 a second optical element coupled to said substrate and located in a fifth position with respect to said substrate, said fifth position defined by a fifth portion of said plurality of registration structures, wherein said fifth position is interposed between said fourth position and said second position, and wherein said second pump laser emission passes through said second optical element prior to impinging on said second surface of said gain medium.

16. The opto-electronic device of claim 12, said resonator optics locatable on said optical bench at any of a plurality of resonator optics locations, wherein said laser resonator formed by said resonator optics is of a cavity length defined by said resonator optics locations, wherein said cavity length determines a Q-switched pulse length.

17. The opto-electronic device of claim 15, further comprising:
 a first set of resonator optics coupled to said optical bench forming a first optical resonator utilizing said semiconductor laser pumped gain medium; and
 a second set of resonator optics coupled to said optical bench forming a second optical resonator utilizing said semiconductor laser pumped gain medium.

18. The opto-electronic device of claim 17, wherein said first optical resonator operates at a first wavelength and said second optical resonator operates at a second wavelength, said first wavelength different from said second wavelength.

19. The opto-electronic device of claim 17, further comprising a first non-linear crystal coupled to said optical bench producing a first output wavelength and a second non-linear crystal coupled to said optical bench producing a second output wavelength.

* * * * *